UNITED STATES PATENT OFFICE.

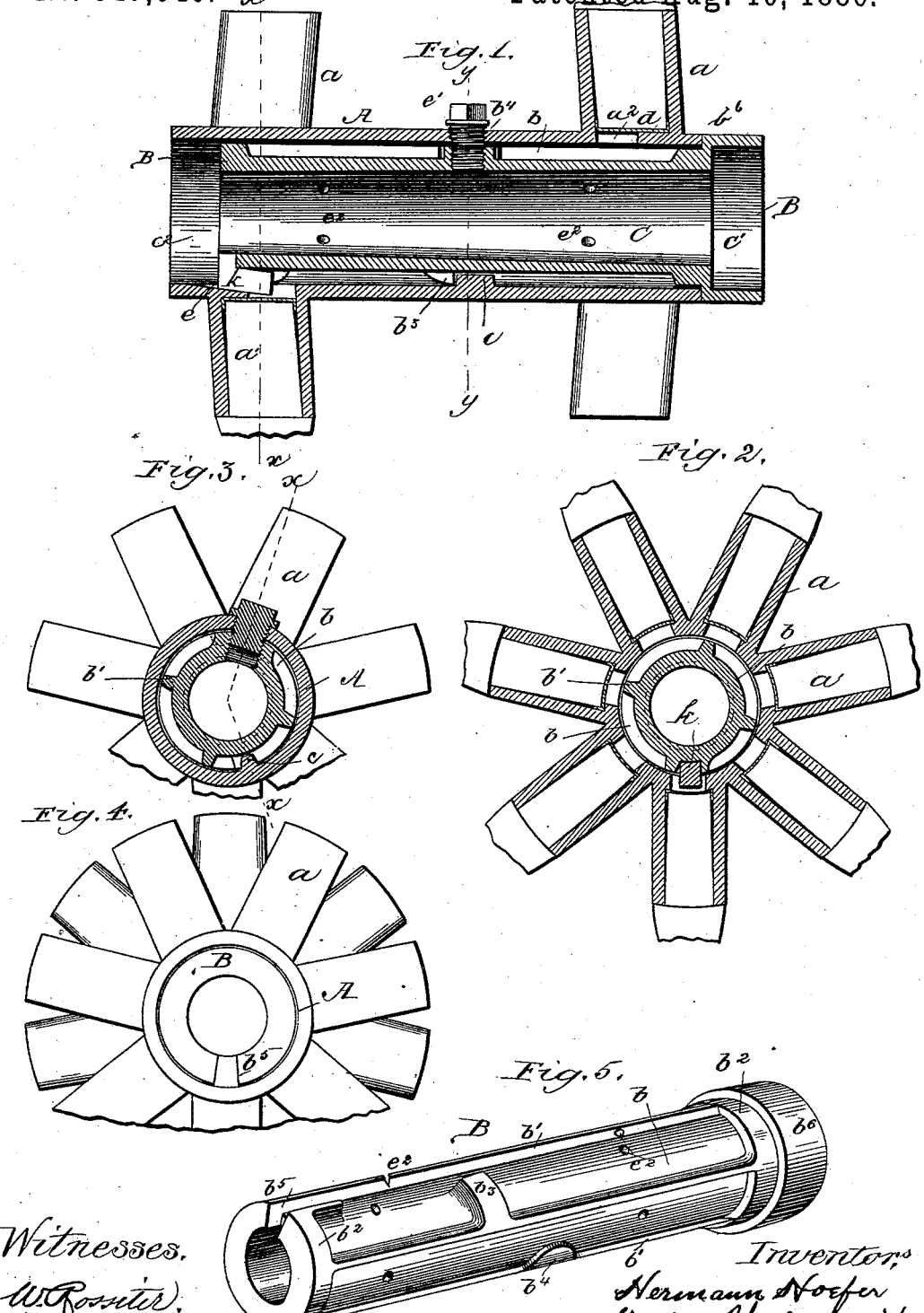

HERMANN HOEFER AND GUSTAV BLECHSCHMIDT, OF LA SALLE, ILLINOIS.

HUB FOR VEHICLE-WHEELS.

SPECIFICATION forming part of Letters Patent No. 347,040, dated August 10, 1886.

Application filed June 22, 1886. Serial No. 205,863. (No model.)

*To all whom it may concern:*

Be it known that we, HERMANN HOEFER and GUSTAV BLECHSCHMIDT, of La Salle, in the State of Illinois, have invented certain new and useful Improvements in Metallic Wagon-Hubs, of which the following is a specification.

The invention consists of an outer metallic shell or hub provided with means for attaching the spokes, and an inner shell or box, to be applied and secured within the hub in the manner shown, and in the features thereof hereinafter more particularly described and claimed.

The accompanying drawings illustrate the invention.

Figure 1 is a central section of a metallic hub containing the invention on line $x\ x$ of Fig. 3. Fig. 2 represents a section of the hub, taken on line $x\ x$ of Fig. 1. Fig. 3 is a section taken on the line $y\ y$ of Fig. 1. Fig. 4 is a front view. Fig. 5 is a perspective view of the box detached.

A designates the outer shell or hub proper, which is preferably cast, having the hollow projections or spoke-arms $a$ at each end for receiving the ends of the spokes $a'$, made integral therewith. The hollow or opening for the spokes extends at one side, as at $a^2$, or some other point in the bottom, through into the interior of the hub, in order to allow the spokes to be driven home without compressing the air in the opening. The interior of the hub is provided with a lug, $c$, and has a key seat or depression, $e$, at the front end.

B designates the inner shell or metal box, which is also preferably cast. It is provided with recesses $b$ in its outer surface which occupy all the surface except $b'$, forming partitions between the recesses $b^2$ at the front and rear ends, $b^3$, near the center, and $b^4$. At the front end it is provided with a slot or key-seat, $b^5$. All those portions of the outer surface not cut away by the recesses when the box is put into the hub fit closely against its interior surface, so as to form open chambers at the recesses. At the rear end the box has a raised portion, $b^6$, corresponding with the outer surface of the hub, and forming a shoulder to fit snugly against the rear end of the hub.

The inner surface, C, is smooth and slightly tapering from the rear to the front end, to answer the purpose of a bearing for the axle-spindle, except at the raised portion, where the opening $c'$ is enlarged and extends over the end of the axle back of the spindle.

In putting the box into the hub the lug $c$ passes through the key seat or slot $b^5$ and into the recess just beyond the part $b^3$, when the rear end of the hub and the shoulder of the raised part of the box meet. A slight turn will then bring the lug in the hub behind the part $b^3$ of the box and the key-seats $e\ b^5$ into line, so that a key, $k$, may be driven in the seats to prevent the box from turning in the hub, and the lug will prevent its being taken out or being moved lengthwise in the hub. As a further means of fastening the box in, a screw-bolt, $e'$, is screwed into a hole in the hub, so as to bear upon or pass into a recess in the part $b^4$ of the box.

It will be seen that the box does not come clear through at the front, but leaves the entire opening of the hub at $c^2$, affording the usual space for the linchpin. The object of the recesses $b$ is to make the complete hub lighter than it would be without them, and they may be increased in depth by raising the outside, so as to make the hub somewhat larger without correspondingly increasing its weight. By extending the recess or hole entirely through the part $b^4$, opposite the screw-hole for the bolt $e'$, the spindle may be oiled without taking off the hub, and by providing holes, as $e^3$, through the box, and holes or notches $e^2$ in the partitions $b'$, the open space formed by the recesses between the box and hub may be used as a reservoir for oil to keep the spindle lubricated constantly while the supply in the reservoir lasts. In order to prevent the oil in such case coming in contact with the ends of the spokes we employ a thin plate of metal, $d$, which is driven in with the spoke, so as to cover the opening $a^2$.

By taking out the key and screw-bolt the box is readily removable from the hub, and may be taken out when desired.

Having thus described our invention, what we claim is—

1. The metallic hub A, having the hollow spoke-arms $a$, lug $c$, and key-seat $e$, in combination with the box B, having recesses $b$, key-seat $b^5$, raised portion $b^6$, and part $b^3$, substantially as and for the purpose specified.

2. The metallic hub A, provided with hollow spoke-arms $a$, lug $c$, and key-seat $e$, in combination with the box B, provided with recesses $b$, having holes $e^2$, as and for the purpose specified.

3. The metallic hub A, having the hollow spoke-arms $a$, provided with an opening, $a^2$, in the bottom, in combination with the spokes and a metal plate, $d$, as and for the purpose specified.

HERMANN HOEFER.
GUSTAV BLECHSCHMIDT.

Witnesses:
PAUL BLECHSCHMIDT,
M. FRIEDMAN.